(12) United States Patent
Aomori et al.

(10) Patent No.: US 7,333,045 B1
(45) Date of Patent: Feb. 19, 2008

(54) BURIED OBJECT DETECTION SENSOR

(75) Inventors: Naoto Aomori, Tomano (JP);
Yoshiyuki Sakamoto, Tamano (JP);
Chihiro Joumuta, Tamano (JP); Fujio Oka, Tamano (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 80 days.

(21) Appl. No.: 11/363,053

(22) Filed: Feb. 28, 2006

(51) Int. Cl.
*G01V 3/12* (2006.01)
*G01S 13/88* (2006.01)
*G01S 13/00* (2006.01)

(52) U.S. Cl. .................. 342/22; 342/27; 342/52; 342/175

(58) Field of Classification Search ........ 324/323–329, 324/332–375; 343/332–375, 731, 732, 745, 343/748, 793, 799, 800, 853, 855, 866, 867, 343/893, 895; 342/21, 22, 27, 52, 53, 59, 342/175, 190–197, 361–366, 188
See application file for complete search history.

(56) References Cited

U.S. PATENT DOCUMENTS

| | | | | |
|---|---|---|---|---|
| 4,746,867 A | * | 5/1988 | Gunton | ................ 324/329 |
| 5,307,272 A | * | 4/1994 | Butler et al. | ................ 324/326 |
| 5,680,048 A | * | 10/1997 | Wollny | ................ 324/329 |
| 6,512,475 B1 | * | 1/2003 | Bogatyrev et al. | ............ 342/22 |
| 6,657,577 B1 | * | 12/2003 | Gregersen et al. | ............ 342/22 |

FOREIGN PATENT DOCUMENTS

JP    A 2001-242263    9/2001

OTHER PUBLICATIONS

I.J. Chant et al., "Overview of Current Radar Land Mine Detection Research at the Defence Science and Technology Organisation, Salisbury, South Australia"; Printed in "The Detection of Abandoned Land Mines: A Humanitarian Imperative Seeking a Technical Solution, EUREL International Conference (Conf. Publ. No. 431)"; pp. 138-142; Oct. 9, 1996.*

* cited by examiner

*Primary Examiner*—Bernarr E. Gregory
(74) *Attorney, Agent, or Firm*—Oliff & Berridge, PLC

(57) ABSTRACT

A combined type buried object detection sensor is provided, in which a MD and a GPR are integrated to improve a detectivity. A buried object detection sensor 10 has a constitution in which plural antenna elements composing a GPR 14 are disposed on a circumference, an inner coil 16 of a MD 12 is arranged at a center portion of the GPR 14 and an outer coil 18 of the MD 12 is arranged at a periphery of the GPR 14, the GPR 14 has slits 20 separating the respective antenna elements, and the slits 20 between adjacent antenna elements are connected by a metal leaf 36.

5 Claims, 3 Drawing Sheets

BURIED OBJECT DETECTION SENSOR

BACKGROUND OF THE INVENTION

1. Field of the Invention

The present invention relates to a buried object detection sensor, and in particular to a buried object detection sensor performing a detection of a buried object from the ground by a combined sensor.

2. Description of the Related Art

A detection device using a metal detector(MD) or a ground penetrating radar (GPR) is used to detect a buried object from the ground. The detection device using the MD has a coil which transmits/receives a magnetism, and is suitable for a detection of an object buried in a relatively shallow depth. Meanwhile, the detection device using the GPR has an antenna which transmits/receives an electromagnetic wave, and is suitable for a detection of an object buried in a deep portion compared to the case when the MD is used. A combined type detection device using both the MD and the GPR is therefore proposed in which both characteristics of the MD and the GPR can be obtained.

As this combined type detection device, an invention according to Japanese Patent publication No. 2001-242263 can be cited. The combined type detection device, disclosed in this Japanese Patent publication No. 2001-242263, has a constitution in which a ring-shaped detection coil to be the MD, and an antenna to be the GPR at a center side of the detection coil, are included. The detection coil generates a magnetic field when a current is supplied, to make a metal object buried underground generate an induced electromotive force. The detection coil senses the magnetic field generated by the induced electromotive force, to thereby probe a presence/absence of a buried object. Besides, the GPR generates an electromagnetic wave from the antenna when the current is supplied. The buried object reflects this electromagnetic wave, and therefore, the antenna senses a reflected electromagnetic wave to probe the presence/absence of the buried object. As stated above, the detection of the buried object is performed by using both sensors in a combined state.

In the combined type detection sensor using the MD and the GPR, when it has a constitution in which a transmission coil of the MD is provided at a center of the GPR and a receiving coil is provided at a periphery of the GPR, an eddy current is generated in the GPR caused by the magnetic field generated at the transmission coil when the current is supplied to the transmission coil. The eddy current forms a loop at all over the GPR, and therefore, a magnetic flux is generated from the GPR, then the magnetic flux works in a direction to deteriorate a performance of the MD. Namely, the magnetic flux generated at the GPR is received by the receiving coil of the MD, and therefore, the receiving coil becomes to have an offset value. The receiving coil has a constant dynamic range, and therefore, an SN ratio may fall if a rate of change of the magnetic field by the buried object is detected under a state having the offset value. A receiving level of the MD in a case of the combined type detection device using the MD and the GPR becomes to be a tenth part or less when the receiving level of the detection device using only the MD is assumed to be one.

SUMMARY OF THE INVENTION

An object of the present invention is to provide a combined type buried object detection sensor improving a detectivity by using both a MD and a GPR.

To attain the above object, in the buried object detection sensor according to the present invention, plural antenna elements composing a GPR are arranged on a circumference, and a MD is arranged so that a center portion of the GPR is to be a axis thereof, wherein the GPR has slits separating the respective antenna elements, and the slits between adjacent antenna elements are connected by a metal leaf. In this case, the GPR and the MD are arranged on the same plane. Here, the GPR and the MD are arranged completely on the same plane, or they may be arranged nearly on the same plane if so regarded as on the same when a detection result is processed. Besides, the above MD has a feature of having a coil arranged at a center portion of the GPR and another coil arranged at a periphery of the GPR.

According to the above-stated constitution, the GPR can be divided into plural antenna elements by the slits, and therefore, a small loop of an eddy current is generated at the respective antenna element and a large loop of the eddy current may not be generated at all over the GPR, even when the eddy current is generated at the GPR by a magnetic field generated by the MD. Consequently, it becomes possible to improve a detection performance of the MD because a magnetic flux generated from the small loop of the eddy current is small, and an amount of the magnetic flux generated from the MD to be cancelled by this magnetic flux becomes small.

Besides, the metal leaf does not conduct the eddy current generated at the antenna elements, but it enables to connect the adjacent antenna elements electrically. Consequently, it is possible to make the respective antenna elements to be the same electric potential (ground), and to maintain a detection performance of the GPR even if the slits are provided.

Further, a buried object detection sensor having a constitution in which a GPR and a transmission/receiving coils of a MD are concentrically arranged, can obtain the above-stated effect if slits dividing antenna elements of the GPR individually, and a metal leaf connecting adjacent antenna elements, are provided.

DETAILED DESCRIPTION OF THE PREFERRED EMBODIMENT(S)

Figure 1:
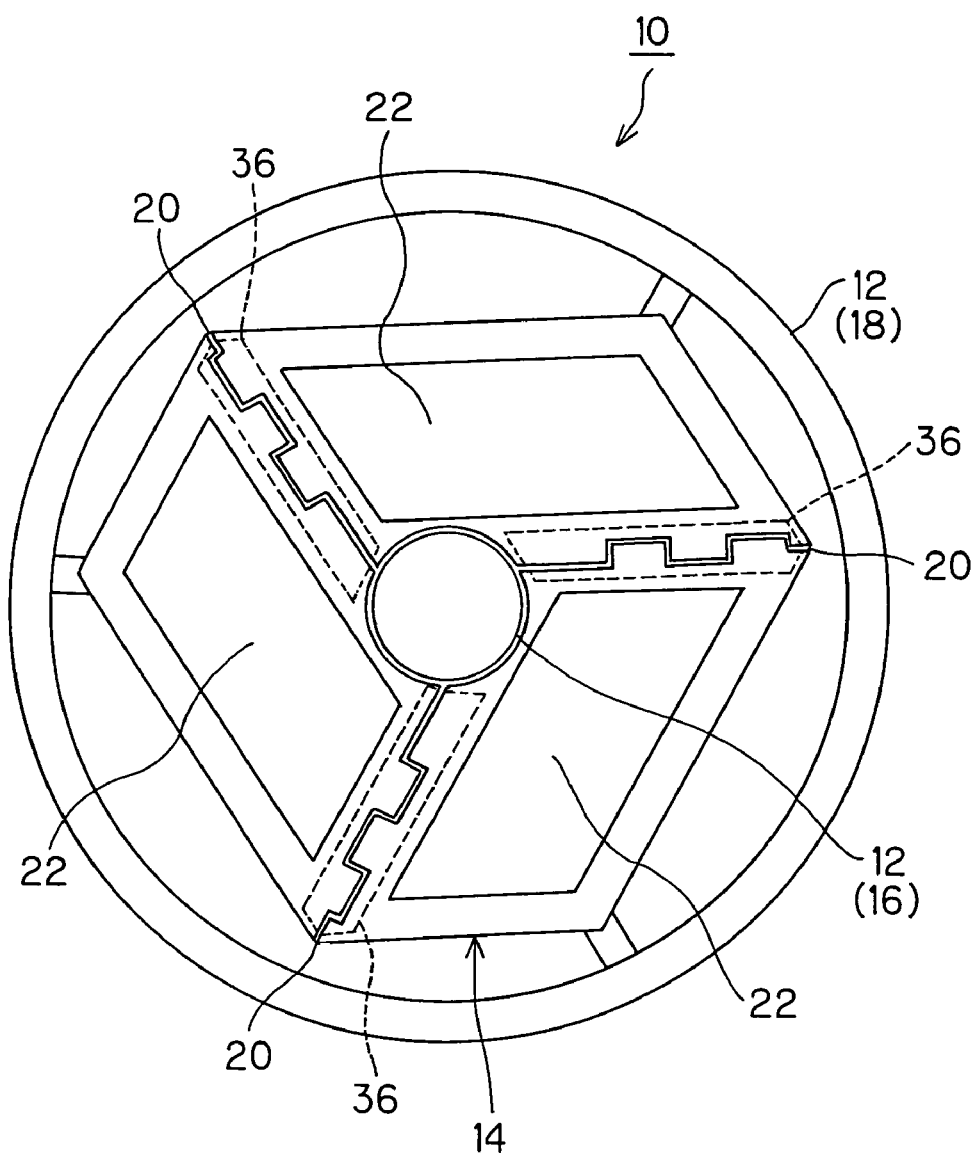
FIG. 1 is a plan view of a sensor portion in a buried object detection sensor according to an embodiment.
Figure 2:
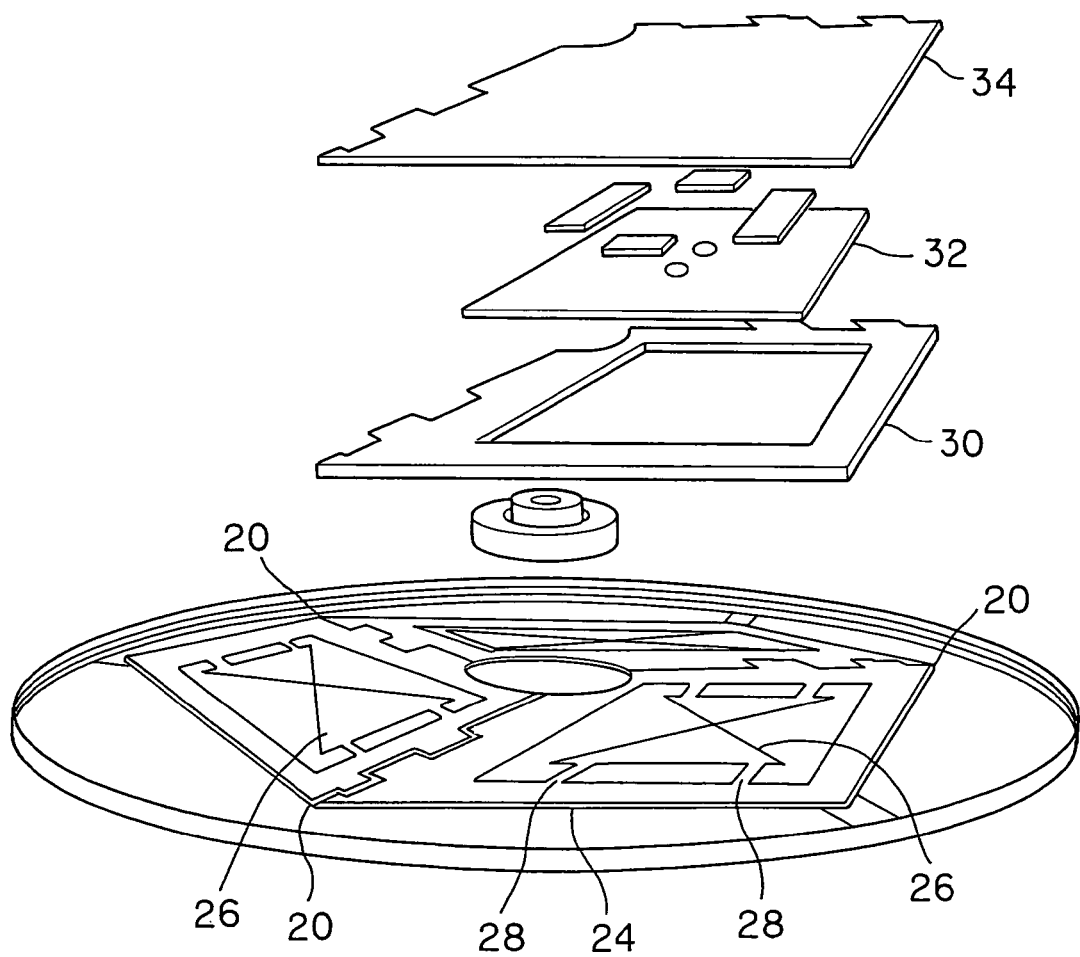
FIG. 2 is an exploded perspective view of the sensor portion in the buried object detection sensor according to the embodiment.

Hereinafter, preferred embodiments of a buried object detection sensor according to the present invention is described. FIG. 1 is a plan view of a sensor portion in the buried object detection sensor. Besides, FIG. 2 is an exploded perspective view of the sensor portion in the buried object detection sensor. A buried object detection sensor 10 is composed of a MD 12 and a GPR 14.

The MD 12 is composed of two coils of an inner coil 16 and an outer coil 18, and these are a transmission coil and a receiving coil. The two coils 16, 18 are formed by respectively winding lead wires (not shown) in circumferential directions, disposed in concentric circles, and formed on the same plane. Incidentally, they do not have to be completely on the same plane, but they may be at positions where they are regarded as the same plane on the process when a detection is performed by using the MD 12. The outer coil 18 is a ring shape, and the inner coil 16 is arranged at a center portion of the ring shape. In such MD 12, the outer coil 18 can be set as the receiving coil and the inner coil 16 is to be the transmission coil, or the outer coil 18 can be set as the transmission coil and the inner coil 16 is to be the receiving coil.

Besides, the GPR 14 composed of plural antenna elements is arranged at a circular ring area between the outer coil 18 and the inner coil 16. The GPR 14 is composed of plain antenna elements, and formed on the same plane with the inner coil 16 and the outer coil 18 of the MD 12. Incidentally, they don't have to be completely on the same plane, but they may be at the positions regarded as the same when the detection is performed by using the MD 12. Namely the position of the GPR 14 may be deviated upward a height where reflected electromagnetic waves from the coils 16, 18 do not affect on the detection, because there is a problem that a detectivity is deteriorated by the reflected electromagnetic waves from the coils 16, 18 of the MD 12. On the contrary, the MD 12 is not able to be set at a height far away from the ground, because a detection depth thereof is originally limited, when the MD 12 is set to be higher than the GPR 14. A deviation in a height direction with the GPR 14 is allowed up to the height in which the MD 12 can secure a sensing of a shallow depth portion unable to be detected by the GPR 14 when the ground is scanned. Substantially, it is not possible to position the MD 12 higher than the GPR 14, and therefore, it is preferable to position them on the same plane. The GPR 14 is a three element radar sensor provided at a periphery of the inner coil 16, and three slits 20 having rectangular wave shapes are formed from the center portion of the GPR 14 toward a side edge direction. The GPR 14 is divided into three GPR antenna elements 22 (antenna element) by the slits 20. The GPR antenna elements 22 are disposed while deviated on a circumference in which a certain point at outside of the GPR antenna elements 22 are set as a reference, and in the present embodiment, they are disposed in a state deviated by 120 degrees in a rotational direction while setting the certain point as the reference.

The GPR antenna element 22 is composed of plural layers, and an antenna base plate 24 is disposed at a bottom layer. Radar antenna elements 26 constituted by placing triangular metal plates at centers thereof as elements and facing vertexes thereof, are provided on the antenna base plate 24. Power feeding terminals 28 are provided at the radar antenna elements 26, and a radio energy is fed from a power feeding module (not shown) provided at the GPR 14 to the radar antenna elements 26 via the power feeding terminals 28. At an upper portion of the antenna base plate 24, an electromagnetic wave absorption material 32 is covered via a spacer 30. The electromagnetic wave absorption material 32 is to absorb electromagnetic wave radiated upward from the radar antenna elements 26. An upper cover 34 is covered at an upper portion of the electromagnetic wave absorption material 32.

Besides, the slits 20 formed between the GPR antenna elements 22 are covered by a metal leaf 36. A cross-sectional area of the metal leaf 36 is adjusted to be thin to have a high resistance value in which the eddy current does not conduct between the antenna elements (GPR antenna elements 22) separated by the slits 20. It is made to be a thin film to have the high resistance, but a conductivity is necessary to make ground potentials of the separated respective antenna elements (GPR antenna elements 22) equal. Namely, the metal leaf 36 has a thickness in which the eddy current generated at the respective GPR antenna elements 22 by the magnetic flux generated at the MD 12 is not conducted, and the thickness in which the grounds of the respective GPR antenna elements 22 to each other are possible. Incidentally, the MD 12 uses a low frequency band of, for example, approximately 1 kHz, the GPR 14 uses a high frequency band of, for example, approximately 2 GHz, and therefore, the thickness of the metal leaf 36 is to be set properly according to the respective frequency bands used by the respective sensor and the material of the metal leaf 36. Herewith, it becomes possible to make a conductive ground of the respective GPR antenna elements 22 to each other even though the eddy current is not conducted through the metal leaf 36.

Figure 3:
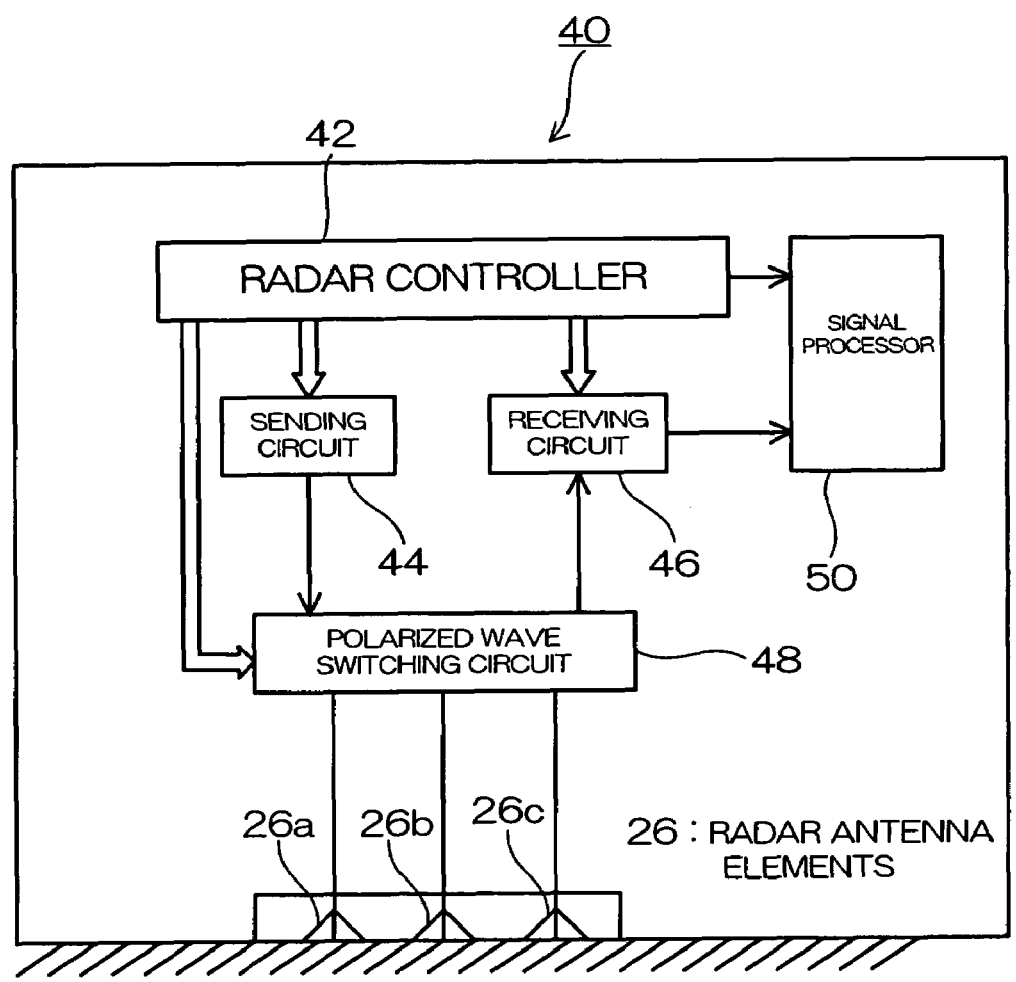
FIG. 3 is an explanatory view of a three element radar antenna system.

FIG. 3 is an explanatory view of a three element radar antenna system. A system 40 includes a radar controller 42 performing an overall control by generating a polarized wave switching pulse, a sending circuit 44 transmitting an electromagnetic wave, a receiving circuit 46 demodulating a reflected wave from the underground, a polarized wave switching circuit 48 connecting one of antenna elements 26a, 26b, and 26c to the sending circuit 44 and another antenna to the receiving circuit 46, and a signal processor 50 performing a calculation asking scattering matrix elements based on signals supplied from both the radar controller 42 and the receiving circuit 46.

Next, an operation of the buried object detection sensor 10 is described. In the MD 12, for example, the inner coil 16 is set as a transmission coil and the outer coil 18 is set as a receiving coil, and when a current is supplied from a power supply to the inner coil 16, then a magnetic flux is generated so as to rotate on a cross section of the inner coil 16. At this time, the magnetic flux is partially divided by the GPR antenna element 22, and therefore, the eddy current is generated at the respective GPR antenna elements 22. This eddy current is generated at the respective GPR antenna elements 22, but it is not generated spreading across the plural GPR antenna elements 22 because the slits 20 are provided between the respective GPR antenna elements 22. An induced electromotive force is generated at a metal object buried underground by a magnetic field generated from the inner coil 16. The outer coil 18 senses the magnetic field generated by the induced electromotive force, to detect the buried object.

Besides, in the GPR 14, the radar antenna elements 26 generate the electromagnetic wave when the current is supplied from the power feeding module to the radar antenna elements 26. This electromagnetic wave is radiated downward, and reflected by the buried object. The GPR 14 senses the reflected wave to detect the buried object. In detail, at first, the radar controller 42 sequentially generates three polarized wave switching pulses. These pulses are supplied to the polarized wave switching circuit 48, then the polarized wave switching circuit 48 sequentially selects two antennas from the radar antenna elements 26 (26a, 26b, and 26c), and one of them is used as receiver, and the other one is used as transmitter. The transmit antenna and the receive antenna are switched each time when the switching pulse is generated. As stated above, the polarized wave for transmission rotates by every 120 degrees, and the polarized wave for receiving also rotates by every 120 degrees having a phase of 120 degrees with the polarized wave for transmission, and therefore, the electromagnetic wave is transmitted in every direction and the reflected wave is received from every direction. There is a case when a detection of a buried object is difficult dependent on a buried direction thereof if the polarized wave direction is fixed. However, in this system, the polarized wave direction changes every second, and therefore, it becomes possible to detect the buried object in any buried direction.

The reflected wave demodulated at the receiving circuit 46 is supplied to the signal processor 50, and the signal processor 50 performs a calculation by asking a scattered matrix as stated below. Assuming an x axis and a y axis orthogonal on a ground surface, and then, a transmission signal and a receiving signal of the radar are in a relation of the scattering matrix shown in formula 1.

$$\underline{S} = \begin{bmatrix} S_{11}(t) & S_{12}(t) \\ S_{21}(t) & S_{22}(t) \end{bmatrix} \quad \text{[formula 1]}$$

Here, $S_{11}$ is a component in which an electromagnetic wave of polarized wave in the x direction is emitted and a reflected wave of polarized wave in the x direction is detected, $S_{12}$ is a component in which the electromagnetic wave of polarized wave in the x direction is emitted and the reflected wave of polarized wave in the y direction is detected, $S_{21}$ is a component in which the electromagnetic wave of polarized wave in the y direction is emitted and the reflected wave of polarized wave in the x direction is detected, and $S_{22}$ is a component in which the electromagnetic wave of polarized wave in the y direction is emitted and the reflected wave of polarized wave in the y direction is detected. Among each component of the scattered matrix asked as stated above, $S_{11}(t)$ and $S_{22}(t)$ having the same polarized wave directions of the transmission and receiving signals are suitable for measuring the one in which the buried object does not have a specified direction component in underground, namely, the one which has an omnidirectional component such as a stratum or a cavity. Besides, $S_{12}(t)$ and $S_{21}(t)$ in which the polarized wave directions of the transmission and receiving signals are orthogonal are suitable for measuring the one in which the buried object in underground has the specified direction component, namely, the one such as a buried pipe.

The antennas are disposed at a center side of the coil, and thereby the coil becomes to have the omnidirectional component for the antenna. Consequently, the above-stated scattered matrix is calculated, and thereby, it becomes possible to detect the buried object while excluding an effect of the coil of the MD 12.

When a blind test is performed by using such buried object detection sensor 10, a detection rate of the buried object was 100%. Here, the blind test is performed as follows: the buried objects are buried at depths of 0 (zero) cm and 10 cm in a 90 cm four-way region. Incidentally, the test is performed while covering the buried object even at the position of 0 (zero) cm with the soil.

As stated above, in the buried object detection sensor 10, the GPR 14 is divided into the plural GPR antenna elements 22 by providing the slits 20, and therefore, even when the eddy current is generated at the GPR antenna element 22 caused by the magnetic field generated by the MD 12, the eddy current is generated by each GPR antenna element 22 and it is not generated spreading across the plural GPR antenna elements 22. Consequently, in the GPR 14 according to the present embodiment, an eddy current loop does not form a loop surrounding all over the GPR as in a GPR according to a conventional art, and therefore, it is possible to turn down the magnetic field generated from the eddy current to thereby reduce a cancel operation of the magnetic field generated from the transmission coil by this magnetic field. Incidentally, in the MD 12 according to the present embodiment, a receiving level can be improved from a tenth part to a second part owing to the slits 20 provided at the GPR 14, to thereby improve the receiving level compared to a buried object detection sensor according to the conventional art. Incidentally, the receiving level of the detection device using only the MD 12 is assumed to be one. Besides, the larger a level of the magnetic field received by the receiving coil of the MD 12, the more the detection performance of the buried object improves, and therefore, the buried object detection sensor 10 according to the present embodiment can improve the detection performance compared to the buried object detection sensor according to the conventional art.

Besides, between the slits 20 formed at the GPR 14 are connected by the metal leaf 36, and therefore, it is possible to conduct the respective GPR antenna elements 22 in the frequency band used by the GPR 14. Consequently, it is possible for the GPR 14 to make electric potentials of the respective GPR antenna elements 22 equal by electrically connecting the GPR antenna elements 22 with each other. Herewith, the performance of the GPR 14 can be maintained.

Besides, the MD 12 and the GPR 14 are arranged on the same plane, and therefore, one of the sensors does not interfere with the other sensor to deteriorate the detection performance. When the GPR 14 is, for example, at an upper portion compared to the outer coil 18 of the MD 12, the electromagnetic wave radiated from the GPR 14 is reflected by the outer coil 18, and the reflected wave is sensed by the GPR 14 to deteriorate the detection performance of the GPR 14. Besides, when the MD 12 is at an upper portion compared to the GPR 14, the magnetic flux generated from the MD 12 generates the induced electromotive force at a metal portion of the GPR 14, and the receiving coil senses the magnetic field generated by the induced electromotive force to deteriorate the detection performance of the MD 12. However, in the buried object detection sensor 10 according to the present embodiment, the MD 12 and the GPR 14 are arranged on the same plane, and therefore, the deterioration of the detection performance as stated above does not occur.

Further, a center position of the outer coil 18 and a center position of the inner coil 16 of the MD 12 are disposed to be coincided or regarded to be coincided with each other, a center position of the GPR 14 is disposed to be coincided or regarded to be coincided with these center positions, and therefore, a process to correct a positional displacement between the MD 12 and the GPR 14 by a program becomes unnecessary. When the same buried object is detected by the GPR 14 and the MD 12 under a state in which the center position of the GPR 14 and the center position of the MD 12 are not coincided, the position of the buried object detected by the GPR 14 and the position of the buried object detected by the MD 12 are shown with displacement, and therefore, it is necessary to correct the displacement by the program. In the buried object detection sensor 10 according to the present embodiment, the center positions of the GPR 14 and the MD 12 are coincided, and it is not necessary to correct the displacement by the program.

Besides, the buried object detection sensor 10 according to the present embodiment is suitable to perform the detection of the buried object while an operator is supporting and moving.

Incidentally, in the above stated embodiment, the slit 20 is described as the rectangular wave shape, but it may be in any shape if it divides an antenna into plural antenna elements, and it may be, for example, a triangular wave shape, a liner shape, and so on. The number of the slits 20 may be an arbitrary number, and not only one of the slits 20 is provided at the respective divided portions as in the embodiment described above, but also a plural number of slits 20 may be provided.

Besides, in the above-stated embodiment, the GPR 14 is a three element radar sensor, but the number of the GPR antenna elements 22 is not limited to be three. Namely, for example, it may be a two element radar sensor when it is displaced 180 degrees each in the rotational direction while using a certain point at outside of the GPR antenna element 22 as a reference, and it may be a four element radar sensor when it is displaced 90 degrees each. The slits may be provided between the GPR antenna elements even when the number of the GPR antenna elements 22 is set to be other than three.

Besides, the GPR antenna elements 22 adjacent with each other are electrically connected by covering the slit 20 with the metal leaf 36, but they may just be electrically connected by the metal leaf 36. For example, the adjacent GPR antenna elements 22 with each other may be connected at side surfaces of the slits with each other by the metal leaf 36. Further, not only the metal leaf 36 but also a thin film with conductivity can be used for the electrical connection between the adjacent GPR antenna elements 22.

Further, the shapes of the inner coil 16 and the outer coil 18 of the MD 12 are not limited to the ring shape, but arbitrary shapes can be used.

What is claimed is:

1. A buried object detection sensor, comprising:
   a ground penetrating radar including plural antenna elements arranged on an outer surface of the ground penetrating radar;
   a metal detector being positioned at a center portion of said ground penetrating radar, the center portion of the ground penetrating radar corresponding to a center position of the metal detector;
   slits separating the respective antenna element of said ground penetrating radar; and
   a metal leaf connecting the antenna elements to each other by spreading across said slits between the adjacent antenna elements.

2. The buried object detection sensor according to claim 1,
   wherein said metal detector includes:
   a coil arranged at the center portion of said ground penetrating radar and another coil arranged at a periphery of said ground penetrating radar.

3. The buried object detection sensor according to claim 1,
   wherein said ground penetrating radar and said metal detector are arranged on the same plane.

4. A buried object detection sensor, in which a metal detector composed of coils, and a ground penetrating radar composed of plural antenna elements arranged on an outer surface of the ground penetrating radar so that a center of the coils is to be a measurement reference point, are arranged on substantially the same plane,
   wherein the ground penetrating radar is disposed on the center of the coils, in which the antenna elements are separated from one another by a slit so as not to allow current caused by a magnetic field generated by the metal detector to spread across the plural antenna elements; and
   wherein a metal leaf electrically connecting the antenna elements separated by the slit to each other, is included.

5. The buried object detection sensor according to claim 4, wherein the coils include an outer coil arranged at an outer periphery of the ground penetrating radar and an inner coil arranged within the outer coil on the outer surface of the ground penetrating radar, and one of the coils is set as a transmission coil and the other is set as a receiving coil.

* * * * *